US011167857B2

(12) United States Patent
Edgar et al.

(10) Patent No.: US 11,167,857 B2
(45) Date of Patent: Nov. 9, 2021

(54) AERIAL DRONE

(71) Applicant: Intelligent Energy Limited, Loughborough (GB)

(72) Inventors: David Edgar, Leicestershire (GB); Henri Winand, Leicestershire (GB)

(73) Assignee: Intelligent Energy Limited, Loughborough (GB)

( * ) Notice: Subject to any disclaimer, the term of this patent is extended or adjusted under 35 U.S.C. 154(b) by 0 days.

(21) Appl. No.: 17/174,237

(22) Filed: Feb. 11, 2021

(65) Prior Publication Data

US 2021/0188453 A1    Jun. 24, 2021

Related U.S. Application Data

(63) Continuation of application No. 15/571,258, filed as application No. PCT/GB2016/051254 on Apr. 29, 2016, now Pat. No. 10,919,635.

(30) Foreign Application Priority Data

May 1, 2015 (GB) .................................. 1507534
Oct. 30, 2015 (GB) .................................. 1519214

(51) Int. Cl.
*B64D 27/24* (2006.01)
*B64D 41/00* (2006.01)
*B64C 39/02* (2006.01)
*H01M 8/1007* (2016.01)

(52) U.S. Cl.
CPC ............ *B64D 27/24* (2013.01); *B64C 39/024* (2013.01); *B64C 2201/021* (2013.01); *B64C 2201/027* (2013.01); *B64C 2201/042* (2013.01); *B64C 2201/104* (2013.01); *B64C 2201/108* (2013.01); *B64C 2201/165* (2013.01); *B64D 2041/005* (2013.01); *B64D 2211/00* (2013.01); *H01M 8/1007* (2016.02); *H01M 2250/20* (2013.01); *Y02T 50/50* (2013.01); *Y02T 50/60* (2013.01); *Y02T 90/40* (2013.01)

(58) Field of Classification Search
CPC .............. B64D 27/24; B64D 2041/005; B64C 2201/042
See application file for complete search history.

(56) References Cited

U.S. PATENT DOCUMENTS

| 3,937,424 | A | 2/1976 | Meier | |
|---|---|---|---|---|
| 6,131,851 | A | 10/2000 | Williams | |
| 6,575,401 | B1 * | 6/2003 | Carver | ................ B64C 29/0008 244/12.2 |

(Continued)

FOREIGN PATENT DOCUMENTS

| CN | 102963525 A | 3/2013 |
|---|---|---|
| DE | 102006020508 A1 | 10/2007 |

(Continued)

OTHER PUBLICATIONS

International Patent Application No. PCT/GB2016/051254; Written Opinion and Search Report; dated Jul. 29, 2016; 10 pages.

*Primary Examiner* — Timothy D Collins
*Assistant Examiner* — Terri L Filosi
(74) *Attorney, Agent, or Firm* — Baker; Mark H. Krietzman

(57) ABSTRACT

The disclosure relates to an unmanned aerial vehicle, wherein the fuel cell provides a structural component of the vehicle.

13 Claims, 5 Drawing Sheets

(56) References Cited

U.S. PATENT DOCUMENTS

| | | |
|---|---|---|
| 8,201,773 B1 | 6/2012 | Durham et al. |
| 2003/0075643 A1 | 4/2003 | Dunn |
| 2008/0318105 A1 | 12/2008 | Burling et al. |
| 2010/0140415 A1 | 6/2010 | Goossen |
| 2016/0181641 A1 | 6/2016 | Hoffjann et al. |

FOREIGN PATENT DOCUMENTS

| | | |
|---|---|---|
| EP | 2193993 A2 | 6/2010 |
| EP | 2660147 A1 | 11/2013 |
| WO | WO 2005/072233 A2 | 8/2005 |
| WO | WO 2014/021970 A2 | 2/2014 |

\* cited by examiner

AERIAL DRONE

CROSS-REFERENCE TO RELATED APPLICATIONS

The present application is a Continuation of U.S. patent application Ser. No. 15/571,258 filed Nov. 1, 2017, which is a 371 National Stage of International Patent Application No. PCT/GB2016/051254 filed Apr. 29, 2016, which claims priority to Great Britain patent application no. 1507534.4 filed May 1, 2015, and Great Britain patent application no. 1519214.9 filed Oct. 30, 2015, the disclosure of all of which are incorporate by reference herein in their entirety.

The present invention relates to aerial vehicles and, in particular, to unmanned aerial vehicles.

Aerial vehicles, or aircraft, may be powered or unpowered. Unpowered aircraft include gliders and some lighter-than-air vehicles, such as balloons. Powered aircraft generally include planes, helicopters or other rotorcraft, microlights, and other lighter-than-air vehicles, such as airships.

Unmanned aerial vehicles (UAVs) have many applications including reconnaissance, remote sensing and providing an airborne base for a telecommunications transceiver. UAVs are typically smaller than manned aircraft and may weigh between a few grams and 20 kilograms, for example. The expression "unmanned aerial vehicle" as used herein is intended to encompass aerial vehicles not capable of conveying a pilot.

UAVs typically require power in order to provide propulsion, which may in some cases be necessary in order for a UAV to remain airborne for a prolonged period, and power for auxiliary functions such as image or video capture, signal telemetry, or other on-board systems. In addition, for many applications the computing power required on-board the vehicle in order to provide the necessary functionality may represent a significant power demand. This is particularly the case in autonomous UAV applications in which an onboard computer may make decisions regarding flight path and the deployment of auxiliary functions. Such an autonomous UAV is pilotless in a strict sense. Alternatively, a UAV may be piloted remotely and so although the vehicle itself is unmanned, it is still under human control.

Some conventional UAVs use primary cells to provide power, although it is now more common to use secondary cells such as lithium-ion batteries. A problem with conventional UAVs is that the flight time may be limited because of the relatively high power demands of the propulsion and other on-board systems. In recent years, photovoltaic panels have been provided on UAVs in order to extend the flight range in comparison to UAVs that have only primary or secondary cells. However, the power generating capacity of a photovoltaic panel depends on the ambient weather condition and the time of day and so photovoltaic panels may not be appropriate for use in all circumstances. In addition, the power generation capacity of photovoltaic panels may be inadequate for some applications in which either high power (speed) propulsion is required or the on-board systems of the UAV that provide its functionality are particularly heavy or demand substantial electrical power.

According to one aspect of the disclosure there is provided an unmanned aerial vehicle comprising a plurality of at least one type of fuel cell system component distributed about the vehicle.

The at least one type of fuel cell system component may be a fuel cell. The at least one type of fuel cell system component may comprise at least one of: a fuel cell, a fuel generator; a coolant structure; a fuel reservoir; and a reactant reservoir.

Each reactant reservoir may comprise a removable cartridge. The fuel generator or reactant reservoir may comprise a catalyst for catalysing a reaction to generate fuel for a fuel cell. The vehicle may be a rotorcraft. The rotorcraft may comprise a body and a plurality of propulsion modules. Each propulsion module may be coupled to the body by a respective strut. The struts may comprise the fuel cell system components. Each strut may comprise one or more of the fuel cell system components. The vehicle may be of a modular construction. One or more of the struts may be detachable from the body.

One of, or a plurality of, the struts may comprise a reactant reservoir or fuel reservoir. One of, or a plurality of, the struts may comprise a coolant structure. One of, or a plurality of, the struts may comprise a plurality of different types of fuel cell system component. One of, or a plurality of, the struts may comprise a fuel cell and a fuel generator. A type of fuel cell component that generates more heat when in use compared to another type of fuel cell system component may be provided closer to the propulsion module than the other type of fuel cell system component.

The body may comprise a reactant or fuel reservoir and/or a fuel cell. The fuel cell may provide a structural component of the vehicle. Each fuel cell may comprise a plurality of fuel cell plates. The plates are orientated to be substantially aligned with each other so that the plates are vertical in use. A vertical air flow path may be provided through the plates.

Each propulsion module is associated with a respective fuel cell. An air inlet of each of the fuel cells may be associated with a respective propulsion module. Each propulsion module may be configured to provide oxidant and/or coolant to the associated fuel cell.

Each propulsion module may be the only active source of oxidant and/or coolant to the associated fuel cell. Each propulsion module may have a propeller or rotor. The fuel cell may be integral with a surface of the vehicle. The fuel cells may provide power for propulsion of the vehicle. The fuel cells may provide power for auxiliary or on-board functions of the vehicle.

The unmanned aerial vehicle may comprise a controller. The controller may be configured to receive electrical power from the fuel cells. The controller may be configured to distribute the electrical power to the propulsion modules.

According to a further aspect of the disclosure there is provided an unmanned aerial vehicle (UAV) comprising a fuel cell, wherein an air inlet of the fuel cell is associated with a propulsion module, and wherein the propulsion module is configured to provide oxidant and/or coolant to the fuel cell. The propulsion module may be the only active source of oxidant and/or coolant to the fuel cell.

According to a further aspect of the disclosure there is provided an unmanned aerial vehicle (UAV) comprising a body and a plurality of propulsion modules connected to the body by respective struts, in which one or more of the struts comprises a fuel cell system component.

According to a further aspect of the disclosure there is provided a detachable strut for an unmanned aerial vehicle (UAV), in which the strut comprises one or more fuel cell system components. The UAV may be a rotorcraft. A propulsion module may be coupled to the strut.

According to a further aspect of the disclosure there is provided an unmanned aerial vehicle (UAV) comprising a fuel cell, wherein the fuel cell provides a structural component of the vehicle.

Any feature described with reference to one of the aspects may be provided in combination with the features of another of the aspects.

The use of an electrochemical fuel cell as a power source for an unmanned aerial vehicle is particularly advantageous because fuel cells can offer improved power/weight and power/volume ratio performance compared to some prior art power supplies. In addition, a fuel cell can provide the level of power demanded in modern UAV applications. By incorporating the fuel cell into a structural component of the UAV, the relative weight added by the fuel cell can be reduced because the fuel cell performs both its primary purpose of power generation and provides a structural support required by the vehicle. As such, the efficiency and performance of the UAV can be improved compared to prior art solutions.

The fuel cell may be a planar fuel cell. The fuel cell may comprise a plurality of fuel cell plates. The plates may be orientated to be aligned with, or transverse to, a mechanical load associated with use of the vehicle, such as a direction of thrust from a propulsion unit of the vehicle. The vehicle may comprise a plurality of fuel cells. The fuel cells may be provided as a fuel cell stack. The fuel cells may be distributed about the vehicle. The vehicle may comprise a plurality of propulsion modules. Each propulsion module may be associated with one of the plurality of fuel cells. An air inlet of the, or each, fuel cell may be associated with the, or a particular, propulsion module. The, or each, propulsion module may be configured to provide oxidant and/or coolant to the, or the associated fuel cell. The, or each, propulsion module may be the only active source of oxidant and/or coolant to the, or the associated, fuel cell. The, or each propulsion module may have a propeller or rotor. The fuel cell may be integral with a surface of the vehicle. The fuel cell may provide power for propulsion of the vehicle or for auxiliary or on-board functions of the vehicle.

According to a further aspect of the disclosure there is provided an unmanned aerial vehicle comprising a fuel cell, wherein an air inlet of the fuel cell is associated with a propulsion module, and wherein the propulsion module is configured to provide oxidant and/or coolant to the fuel cell. The propulsion module may be the only active source of oxidant and/or coolant to the fuel cell.

According to a further aspect of the disclosure there is provided an unmanned aerial vehicle comprising a plurality of fuel cells. The fuel cells may be distributed about the vehicle. The vehicle may comprise a plurality of propulsion modules. Each propulsion module may be associated with a respective one of the plurality of fuel cells.

According to a further aspect of the disclosure there is provided an aerial vehicle comprising a fuel cell.

The vehicles according to the any aspects may comprise any of the features described with regard to any other aspect or features otherwise described herein.

Embodiments of the present invention will now be described by way of example and with reference to the accompanying drawings in which:

FIG. 4b illustrates a schematic longitudinal cross section through a strut of the rotorcraft of FIG. 4a;

FIG. 6b illustrates a schematic longitudinal cross section through a strut of the rotorcraft of FIG. 6a.

Figure 1:
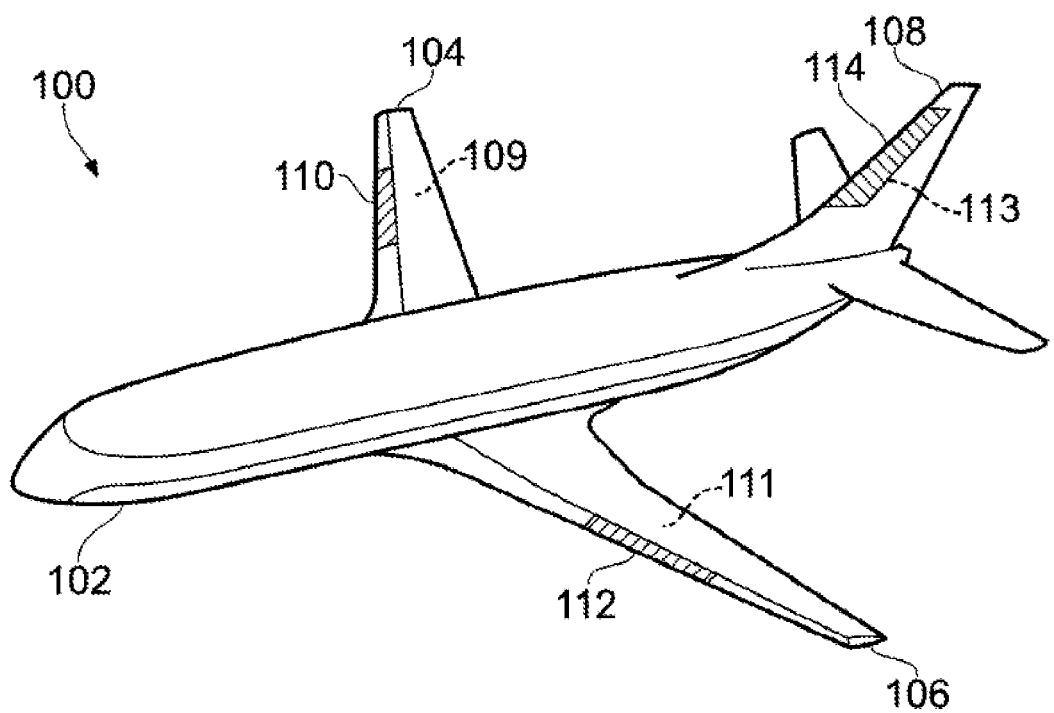
FIG. 1 illustrates a schematic view of a glider comprising fuel cells.

Throughout the present specification, the descriptors relating to relative orientation and position, such as "horizontal", "vertical", "top", "bottom" and "side", are used in the sense of the orientation of the unmanned aerial vehicle as presented in the drawings. However, such descriptors are not intended to be in any way limiting to an intended use of the described or claimed invention. Corresponding series of reference numerals are used in the figures in order to refer to similar or corresponding features between different figures.

Electrochemical fuel cells convert fuel and oxidant, generally both in the form of gaseous streams, into electrical energy and a reaction product. A common type of electrochemical fuel cell for reacting hydrogen and oxygen comprises a polymeric ion transfer membrane, also known as a proton exchange membrane (PEM), within a membrane-electrode assembly (MEA), with fuel and air being passed over respective sides of the membrane.

Protons (i.e. hydrogen ions) are conducted through the membrane, balanced by electrons conducted through a circuit connecting the anode and cathode of the fuel cell. To increase the available voltage, a stack can be formed comprising a number of series-connected MEAs arranged with separate anode and cathode fluid flow paths. Such a stack is typically in the form of a block comprising numerous individual fuel cell plates held together by end plates at either end of the stack. In general, the expression "fuel cell" is used herein to encompass either a single fuel cell or a plurality of individual fuel cells assembled in series to form a fuel cell stack.

FIG. 1 illustrates a glider, which is an example of an unpowered aerial vehicle 100. The vehicle 100 has a body 102, a pair of wings 104, 106 and a tailplane 108 with an upright portion. Each of the wings 104, 106 and upright portion of the tailplane 108 comprises a fuel cell 109, 111, 113. The fuel cells 109, 111, 113 may be configured to provide power to on-board systems such as telecommunication systems.

The fuel cells 109, 111, 113 each provide a structural component of the vehicle 100 in that they are integrated with a structural component of the vehicle. A structural component may provide a function of the vehicle 100. In this example, the fuel cells 109, 111, 113 are formed as unitary components with the wings 104, 106 and tailplane 108. External surfaces of end plates of each of the fuel cells 109, 111, 113 may be aerodynamically shaped in order to at least partially provide the functionality of the structure with which they are integrated. By providing the fuel cells as part of structural components, as opposed to providing additional components within the body 102 of the vehicle 100 or providing an additional layer such as a photovoltaic skin on top of structural components, the overall weight of the vehicle 100 may be reduced. In some examples, one or more of the fuel cells 109, 111, 113 may be configured to bear a mechanical load of the vehicle 100.

Examples of mechanical loads include those associated with flight or landing.

The fuel cells 109, 111, 113 each have an air inlet 110, 112, 114 in order to draw in oxidant and/or coolant. Such an arrangement may be particularly advantageous for air cooled, open cathode fuel cells. Fans may be provided at the air inlets 110, 112, 114 in order to draw in the air. Alternatively, the air inlets 110, 112, 114 may be fan less (without fans) and rely on the motion of the vehicle 100 through the air when in flight to draw air into the forward facing fans. Each fuel cell 109, 111, 113 also has an air outlet (not shown), which may be provided downstream of the air inlet 110, 112, 114.

An advantage of distributing the plurality of separate fuel cells 109, 111, 113 around the vehicle 100 is that, in the event of a failure of a particular fuel cell 109 due to, for example, the impact of a foreign object such as a bird with its inlet 110, the remaining fuel cells 111, 113 located at distal parts of the vehicle 100 may continue to operate and provide power as normal. A controller may be provided in order to manage power production by the fuel cells 109, 111, 113 in accordance with the demands of the vehicle 100.

A separate fuel supply module may be provided to each of the fuel cells 109, 111, 113.

Alternatively, a central fuel supply module may serve the fuel cells 109, 111, 113.

Figure 2:
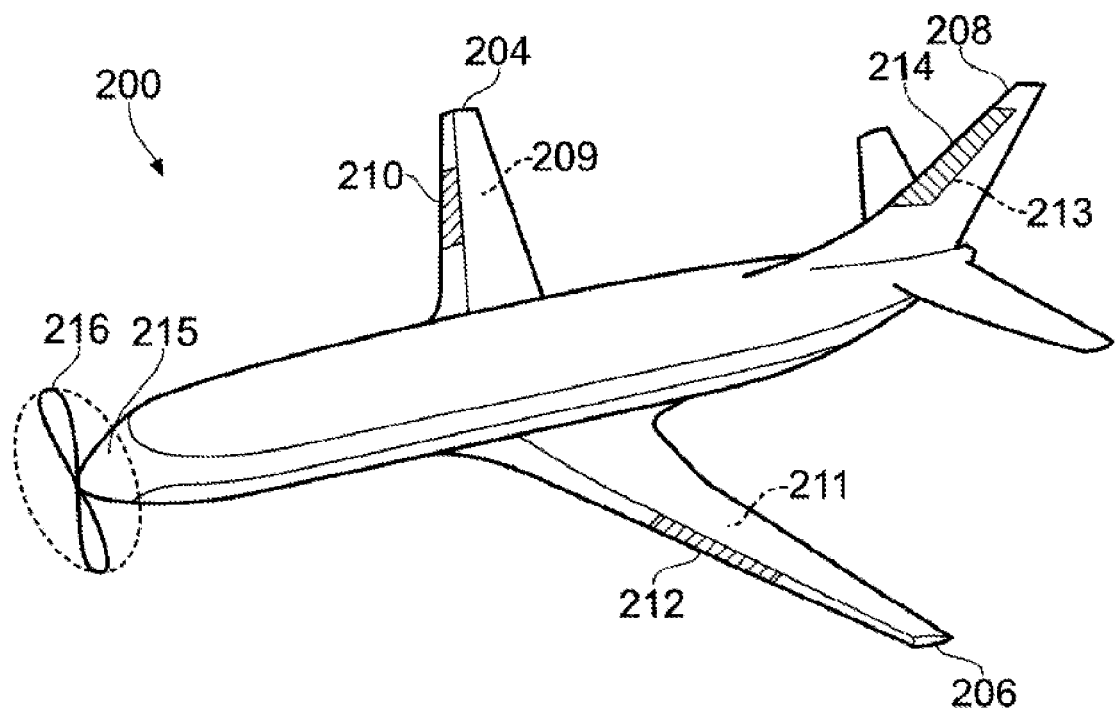
FIG. 2 illustrates a schematic view of a plane comprising fuel cells.

FIG. 2 illustrates a plane, which is an example of a powered aerial vehicle 200. The vehicle 200 is generally similar to the vehicle described with reference to FIG. 1, and in addition comprises a propulsion module 215. The propulsion module 215 is configured to propel the vehicle 200 during flight. It will be appreciated that a wide variety of types of propulsion module are available. In this example, the propulsion module 215 comprises a motor configured to drive a propeller 216. In use, the propeller rotates in order to propel air over the aerodynamic surfaces of the vehicle in order to generate both thrust and lift.

The propulsion module and air inlets 210, 212, 214 of the fuel cells 209, 211, 213 in this example are arranged on the wings 204, 206 and upright portion of the tailplane 208 such that air is propelled by the propulsion module into the air inlets 210, 212, 214 in order to provide oxidant and/or coolant to the fuel cells 209, 211, 213.

The fuel cells 209, 211, 213 may provide power for propulsion of the vehicle in addition to power for other on-board systems, which in the context of a powered flight vehicle may be considered to provide auxiliary functions. The propulsion module 215 may be an electric motor powered by the fuel cells 209, 211, 213.

Figure 3:
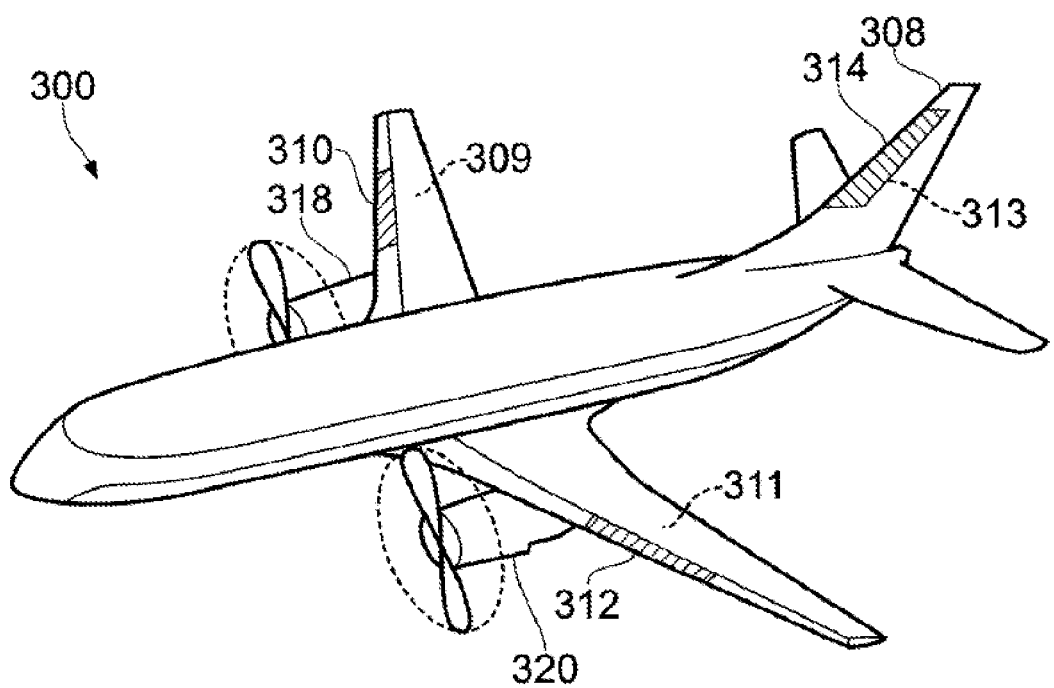
FIG. 3 illustrates a schematic view of another plane comprising fuel cells.

FIG. 3 illustrates another vehicle 300. The vehicle 300 is similar to that described with reference to FIG. 2 and includes a plurality of propulsion modules 318, 320.

A first propulsion module 318 is associated with an air inlet 310 of a first fuel cell 309. A second propulsion module 320 is associated with an air inlet 312 of a second fuel cell 311.

The first and second propulsion modules 318, 320 are configured to provide oxidant and/or coolant to the respective first and second fuel cells 309, 311.

Each air inlet 310, 312 may have an open face that is transverse to, or substantially normal to, a direction of thrust from the propulsion module 318, 320 with which it is associated.

The air inlets 310, 312 of the first and second fuel cells 309, 311 may be fanless and rely solely on the propulsion modules 318, 320 to draw air into the first and second fuel cells 309, 311. That is, the propulsion modules 318, 320 may be the only active source of oxidant and/or coolant for the first and second fuel cells 309, 311. An advantage of such an arrangement is that the additional spatial volume, weight and material cost associated with additional fans for drawing air into the fuel cells 309, 311 may be eliminated.

The first fuel cell 309 may be configured to provide power to the first propulsion module 318. The second fuel cell 311 may be configured to provide power to the second propulsion module 320. In this way, the power supply for the first propulsion module 318 may be provided separately from the power supply for the second propulsion module 320.

Alternatively, power from both the first and second fuel cells 309, 311 may be provided to both the first and second propulsion modules 318, 320. One or more controllers may be provided in order to control operation of the fuel cells 309, 311 in accordance with the demands of the first and second propulsion modules 318, 320 and, optionally, in accordance with the power demand of any other on-board systems on the vehicle 300.

As in the vehicle of FIG. 2, the vehicle 300 comprises a third fuel cell 313 provided in the tailplane 308. An air inlet 314 of the third fuel cell 313 is independent of the airflow directly driven by the first and second propulsion modules 318, 320. A fan may be provided at the air inlets 314 in order to draw in air to the fuel cell 313. Alternatively, the air inlet 314 may be fanless and rely on air to be drawn into the forward facing air inlet 313 by the motion of the vehicle 300 through the air when in flight.

FIGS. 4 to 6 provide examples of unmanned aerial vehicles that comprise a fuel cell system with a plurality of at least one type of fuel cell system component. Each type of fuel cell system component is distributed about the vehicle so that each component of a particular type is spatially separated from other components of that type.

FIGS. 4 to 6 each illustrate a quadcopter, which is an example of a rotorcraft 400, 500, 600. Each rotorcraft 400, 500, 600 comprises a body 438 and a plurality of propulsion modules 440-443. The body is located centrally with respect to the plurality of modules and may also be referred to as a central body 438. A controller and/or other on-board systems of the rotorcraft 400 may be provided within the central body 438. The propulsion modules 440-443 are coupled to the central body 438 by respective struts 444-447, which may also be referred to as arms, or limbs, of the rotorcraft 400, 500, 600. The struts 444-447 are examples of structural components of the rotorcraft 400, 500, 600. Each propulsion module 440-443 comprises a motor that is configured to drive a respective rotor 448-451. The rotors 448-451 provide thrust and lift for the rotorcraft 400, 500, 600 in a conventional manner.

Figure 4A:
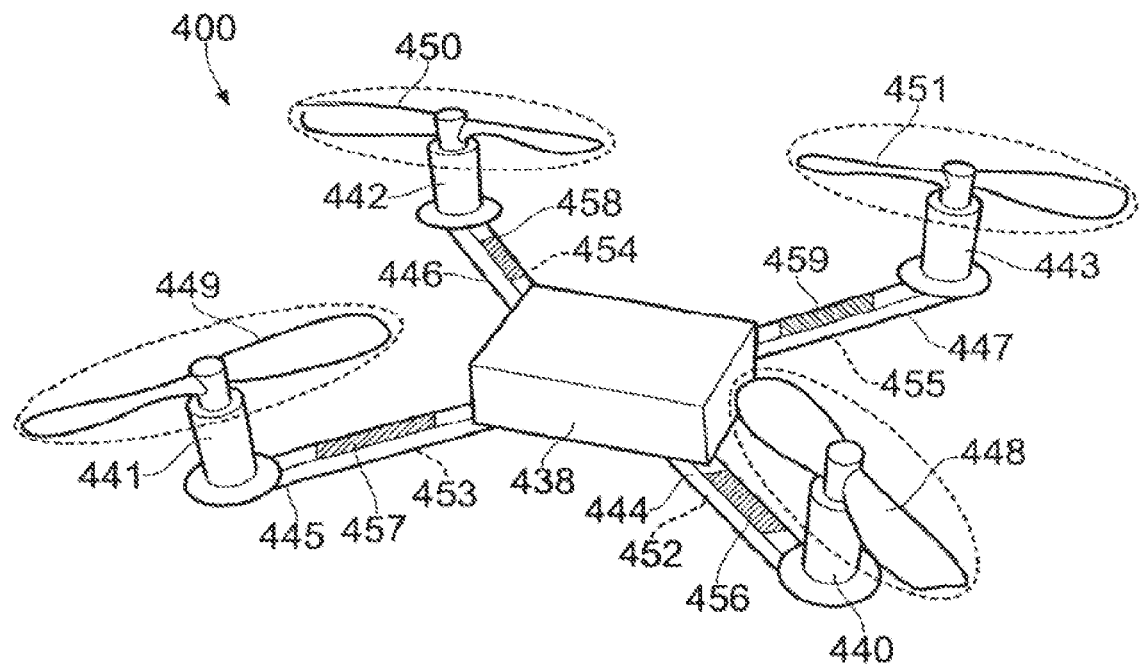
FIG. 4a illustrates a schematic view of a rotorcraft comprising a plurality of fuel cells.

In FIG. 4a, the rotorcraft 400 comprises a plurality of fuel cells 452-455 distributed about the vehicle. Each of the struts 444-447 comprises a fuel cell 452-455 having an air inlet 456-459 on a top surface of the strut, an air outlet (not shown) on a bottom surface of the strut and an air flow path within the struts 444-447 between the respective air inlets 456-459 and air outlets. The fuel cells 452-455 comprise plates, such as bipolar plates, that are aligned vertically within the struts 444-447. Each fuel cell 452-455 may be provided by an individual fuel cell or fuel cell stack.

In some examples, each fuel cell 452-455 may provide one of the struts 444-447. That is, each fuel cell 452-455 may be integrally formed with one of the struts 444-447. Such fuel cells 452-455 are configured to bear a mechanical load placed on the struts 444-447 by the central body 438 and the propulsion modules 440-443. Additional mechanical loads include those associated with flight or landing. The plates of the fuel cells 452-455 are orientated to be aligned with mechanical loads, such as the direction of thrust of the propulsion modules 440-443, when the vehicle is in use. The plates of the fuel cells 452-455 may be especially rigid perpendicular to a plane of the plates and so resist a force applied in the vertical direction by the propulsion modules 440-443.

In FIG. 4a, each air inlet 456-459 is associated with a respective propulsion module 440-443 and each propulsion module 440-443 is configured to provide air as an oxidant and/or coolant to a respective fuel cell 452-455.

As in the example described with reference to FIG. 3, the air inlets 456-459 of the fuel cells 452-455 may be fanless and rely solely on the propulsion modules 440-443 to draw air into the fuel cells 452-455. That is, the propulsion modules 440-443 may be the only active source of air to provide oxidant and/or coolant for the fuel cells 452-455.

The rotorcraft 400 may have a modular construction in which the struts 444-447 are detachable from the central body 438 using a clip-on arrangement, for example. Such an arrangement may enable the body 438 to be extensible in order to change the payload carrying capability of the rotorcraft 400. An extended body may be able to accommodate a greater number of clip-on struts and so carry a greater weight. By providing a fuel cell system component in the strut 444-447, the power generating capability of the rotorcraft 400 can be varied accordingly with the number of propulsion modules 440-443. In addition, the provision of a modular construction of the rotorcraft 400 may be useful in reducing a volume of space occupied by the rotorcraft 400 in storage.

Figure 4B:
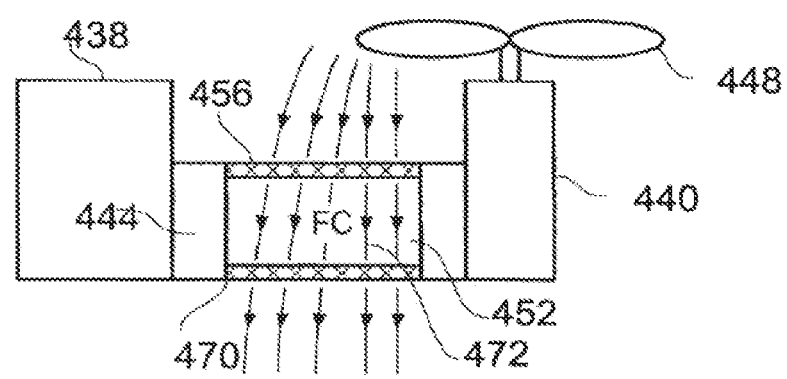

FIG. 4b illustrates a schematic longitudinal cross section through one of the struts 444 of the rotorcraft 400 of FIG. 4a. In this view, the air inlet 456 and the air outlet 470 are visible on respective faces of the strut 444. The air inlet 456 faces the rotor 448 in order to receive the oxidant and/or coolant for the fuel cell 452. An air flow path 472 is provided from the rotor 448 of the propulsion device 440 to the inlet 456 of the fuel cell 452, through the fuel cell 452 within the strut 444 and is exhausted from the outlet 470 on the reverse face of the strut 444. The fuel cells 452-455 are orientated so that the air flow path 472 through the fuel cells is aligned with a downdraught produced by the propulsion modules 440 in order to reduce drag.

Figure 5A:
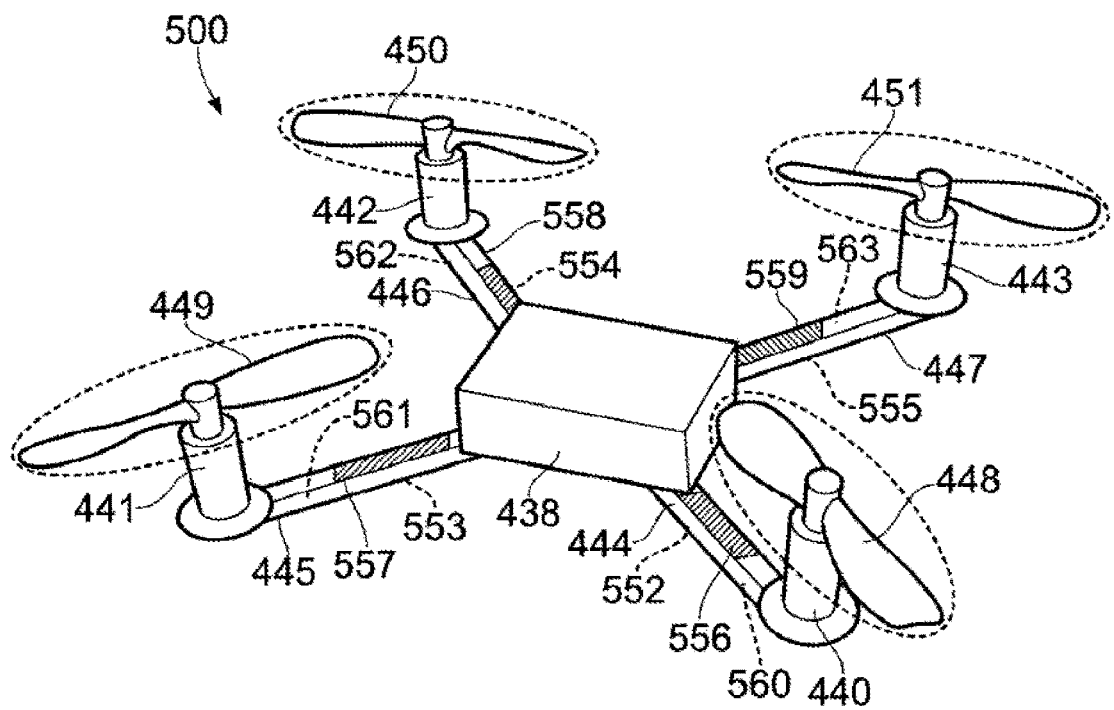
FIG. 5a illustrates a rotorcraft comprising a plurality of fuel cells and a plurality of fuel generators.

FIG. 5a illustrates a rotorcraft 500 comprising a plurality of fuel cells 552-555 and a plurality of fuel generators 560-563. The plurality of fuel cells 552-555 and fuel generators 560-563 are each distributed about the rotorcraft 500. Each of the struts 444-447 comprises one of the plurality of fuel cells 552-555 and one of the plurality of fuel generators 560-563. Each of the plurality of fuel cells 552-555 has an inlet 556-559. The arrangement of the fuel cells 552-555 and respective inlets 556-559 is generally similar to that described previously with reference to FIG. 4a.

The fuel generators 560-563 may be provided by known hydrogen generators that are configured to react a first reactant, such as sodium borohydride, with a second reactant, such as water, in order to generate fuel, such as hydrogen gas, for consumption by the fuel cells 552-555. The fuel generators 560-563 may comprise a catalyst for catalysing the reaction to generate hydrogen gas from the first and second reactants. Such reactions are typically exothermic.

The temperature that is reached in the fuel generators 560-563 during use may be lower than would be the case if the same volume of fuel generator was provided at a single, centralised location in the rotorcraft 500, rather than distributed about the rotorcraft 500.

As such, the requirements for cooling of the fuel generators 560-563 may be reduced. This is advantageous because cooling systems, such as fans and heat sinks, may add additional bulk and weight to the rotorcraft and so reduce its efficiency.

A fuel generator typically generates more heat that a fuel cell when in use and so in this example the fuel generators 560-563 are provided closer to the propulsion modules 440-443 than the fuel cells 552-555 in order that the fuel generators 560-563 are subject to more cooling from downdraft from the rotors 448-451 of the propulsion modules 440-443.

Each fuel cell 552-555 may be associated with a respective propulsion module 440-443 such that each propulsion module 440-443 only receives electrical power from a particular fuel cell 552-555, which may be the fuel cell 552-555 provided in the strut 444-447 that is connected to that particular propulsion module 440-443.

Each fuel generator 560-563 may be provided with a respective reactant reservoir for one or more reactants. In order to avoid uneven depletion of the reactant reservoirs associated with the fuel generator 560-563, it is advantageous to provide a controller that is configured to: distribute electrical power from the fuel cells 552-555 to the propulsion modules 440-443 in accordance with the requirements of the propulsion modules and a remaining reactant level in each of the reactant reservoirs; and additional or alternatively to redistribute the one or more reactants between the reactant reservoirs 560-563 during flight in accordance with variations in the reactant levels of the reactant reservoirs 560-563. The redistribution of the one or more reactants may assist in maintaining an appropriate weight balance of the unmanned aerial vehicle and so ensure that its flight characteristics remain within expected parameters. The redistribution of the one or more reactants may be achieved by transferring the one or more reactants directly between the various reactant reservoirs 560-563. In some cases, the controller may be configured to adjust a flying mode of the unmanned aerial vehicle, such as its direction, in order to change the fuel consumption from the various reactant reservoirs and so rebalance the relative distribution of the one or more reactants.

Various options for arranging fuel cell system components within one of the struts 444 and the body 438 are described below with reference to FIGS. 5b to 5e. Similar arrangements may be provided in the other struts 445-447 described with reference to FIG. 5a.

Figure 5B:
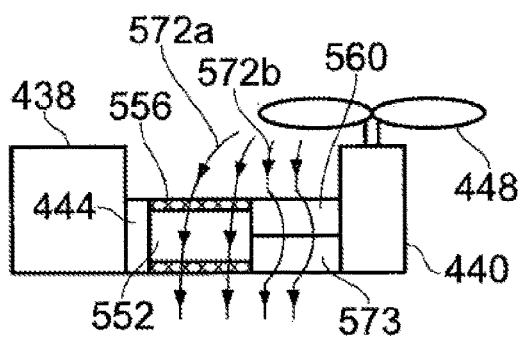
FIG. 5b illustrates a schematic longitudinal cross section through a strut of the rotorcraft of FIG. 5a in which a fuel generator, a reactant cartridge and a fuel cell are located within the strut.

FIG. 5b illustrates a schematic longitudinal cross section through a strut 444 of the rotorcraft of FIG. 5a. In addition to the components described with reference to FIG. 5a, the strut 444 has a bay for receiving and interfacing with a removable reactant cartridge 573. The bay for the removable reactant cartridge 573 is situated adjacent to the fuel generator 560 within the strut 444.

In this example, the reactant cartridge 573 provides a reservoir for at least one reactant. The reactant cartridge 573 may comprise a first reservoir for a first reactant and a second reservoir for a second reactant. Alternatively, the reactant cartridge 573 may comprise a single reservoir to store a mixture of the first and second reactants and a reaction retarding chemical. A catalyst may be provided in the reaction chamber 560 in such examples to overcome the reaction retarding effects of the chemical. Sodium hydroxide, for example, may be used as a reaction retarding chemical in the case where the first reactant is sodium borohydride and the second reactant is an aqueous solution such as water. Other examples of first reactants for use with an aqueous second reactant include other metal borohydrides, nano-silicon, aluminium and other metals made active for water splitting, lithium hydride, lithium aluminium hydride, sodium aluminium hydride, calcium hydride and sodium silicide. In other examples, a thermolysis fuel may be used in the least one reactant. Thermolysis fuels include ammonia borane, aluminium hydride (alane) and magnesium borohydride. There are also fuels that require the use of a reformer, such as methane or butane, for example.

Providing fuel cell system components such as the removable reactant cartridges within the struts 444-447, as opposed to elsewhere in the drone, may reduce the drone surface area and volume because the struts would otherwise provide unoccupied space.

A first air flow path 572a and a second air flow path 572b are also shown in FIG. 5b. The first air flow path passes through the fuel cell 452 in a similar manner to that described with reference to FIG. 4b, although in this case the position of the fuel cell 452 is further offset from the propulsion module 444 along the length of the strut 444. The second air flow path 572b flows around a portion of the strut 444 that houses the fuel generator 560 and the reactant cartridge 573, rather than through the strut 444. Cooling is therefore provided to the fuel generator 560 and the reactant cartridge 573 through a surface of the strut 444.

The portion of the strut 444 that houses the fuel generator 560 and the reactant cartridge 573 may take a conventional aerodynamic design in order to avoid disturbing airflow and creating drag.

Figure 5C:
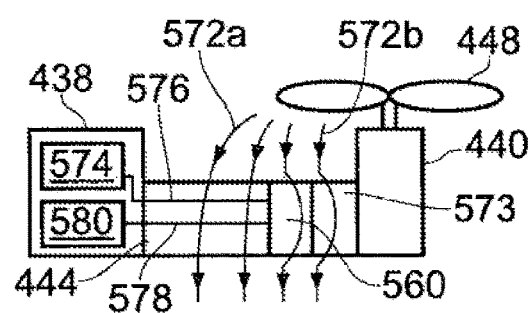
FIG. 5c illustrates a schematic longitudinal cross section through a strut in which a fuel generator, a first reactant reservoir and a fuel cell are located within the strut and a second reactant reservoir is located within the body.

FIG. 5c illustrates a schematic longitudinal cross section through an alternative arrangement of the strut 444. A fuel cell is not shown within the strut 444 in order to enable the other fuel cell system components to be shown more clearly. A fuel cell may be provided within the strut 444 of FIG. 5c in a similar manner to that described with reference to FIG. 5b.

In this example, the reactant cartridge 573 provides a first reactant reservoir for a first reactant, such as sodium borohydride. A second reactant reservoir for holding a second reactant, such as water, is provided within the central body 438. In this case, the strut 444 has a conduit 576 for providing the second reactant from the second reactive reservoir 574 in central body 438 to the fuel generator 560 within the strut 444. The second reactant reservoir 574 may be provided as a cartridge or as a refillable container. The strut 444 also has an optional conduit 578 for transporting reactant by-product from the fuel generators 560-563 to an optional waste storage portion 580 of the central body 438.

Typically, a reactant reservoir may be a relatively heavy component of the UAV when it is full of water. Providing heavy components closer to the centre of mass of the UAV reduces the rotational inertia of the UAV and so improves its agility and manoeuvrability. Further, heating of the water within the second reactant reservoir 574 may be avoided by providing the second reactant reservoir 574 distally from the fuel generator 560.

As an alternative to the example shown in FIG. 5c, the reactant cartridge 573 may be omitted and the second reactant reservoir 574 may be the only reactant reservoir for the fuel cell in the strut 444. For example, a mixture of a first reactant, a second reactant and a reactant retarding chemical may be provided within the second reactant reservoir 574 as described previously.

Figure 5D:
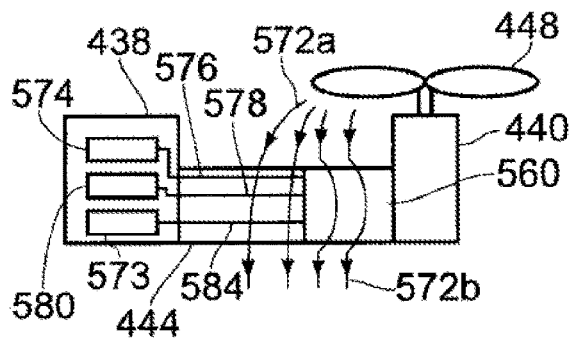
FIG. 5d illustrates a schematic longitudinal cross section through a strut in which a fuel generator and a fuel cell are located within the strut and first and second reactant reservoirs are located within the body.

FIG. 5d illustrates a schematic longitudinal cross section through a further alternative arrangement of the strut 444. In this example, the fuel cell (not shown) and fuel generator 560 are provided within the strut 444 as described previously with reference to FIGS. 5b and 5c. This example differs from that described with reference to FIG. 5c in that the first reactant reservoir is provided within the central body 438. In this example, the first reactant reservoir is provided as a reactant cartridge 573.

Figure 5E:
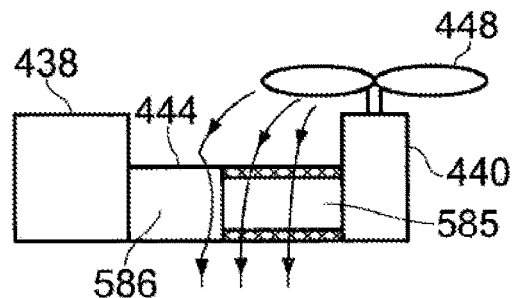
FIG. 5e illustrates a schematic longitudinal cross section through a strut comprising a fuel cell and a fuel reservoir.

FIG. 5e illustrates a schematic longitudinal cross section through a further alternative arrangement of the strut 444 which differs from the example described with reference to FIG. 5b in that the fuel generator is omitted. The reactant cartridge of FIG. 5b is replaced by a removable fuel cartridge 586 within the strut 444. The removable fuel cartridge contains fuel, such as hydrogen gas, for a fuel cell 585 within the strut rather than precursor reactants for generating fuel for the fuel cell 585. Typically, the fuel cell 585 may generate more heat than the fuel cartridge 586 when in use and so the fuel cell is positioned closer to the downdraught from the rotor 448 than the fuel cartridge 586. Air flow from the rotor 448 flows over a surface of the fuel cartridge 586 in a similar manner to that described previously for airflow over the fuel generator and reactant cartridge in previous examples.

The fuel cartridge 586 may be conventionally aerodynamically shaped in order to avoid disturbing airflow and creating drag.

Figure 6A:
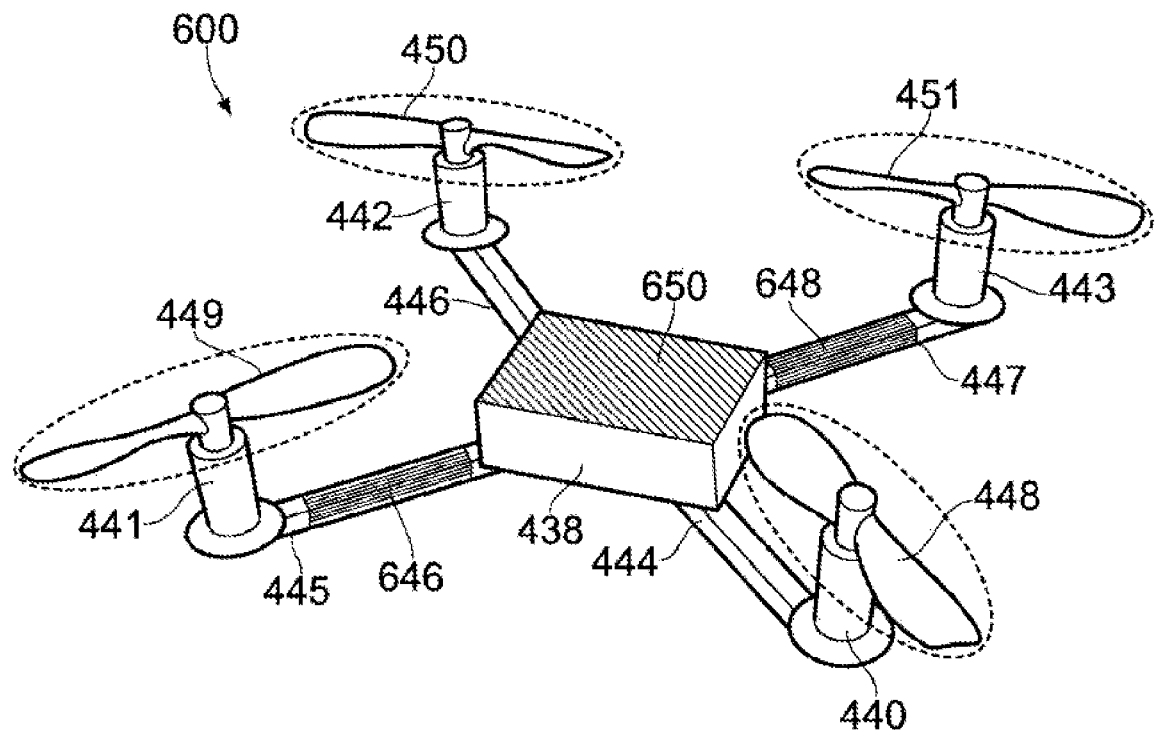
FIG. 6a illustrates a rotorcraft comprising a plurality of coolant structures.

FIG. 6a illustrates a rotorcraft 600 comprising a fuel cell system with a plurality of coolant structures 646, 648. The coolant structures 646, 648, which may be provided by heat pipes, act as heat sinks for other components of the fuel cell system. The coolant structures 646, 648 are provided within some of the struts 445, 447 in this example. The coolant structures 646, 648 may provide structural components of the struts 445, 447, that is, they may bear the load of the propulsion modules 441, 443 and the loads inflicted upon the rotorcraft 600 during flight.

Each of the coolant structures 646, 648 is associated with a different propulsion module 441, 443, which acts as an active source of coolant air for the coolant structure 646, 648 so that the flow of air around or through the coolant structure cools the fuel cell components within the central body 438.

In this example, the central body 438 comprises fuel cell system components including a fuel cell (not shown in FIG. 6a). The fuel cell system components within the central body 438 are thermally coupled to the coolant structures 646, 648 in order for excess heat to be conducted away from the fuel cell components and dissipated. An air inlet 650 for the fuel cell is shown on a top surface of the body 438. The air inlet 650 of the fuel cell is arranged to receive ambient air or disturbed airflow from the propulsion modules 441, 443.

Figure 6B:
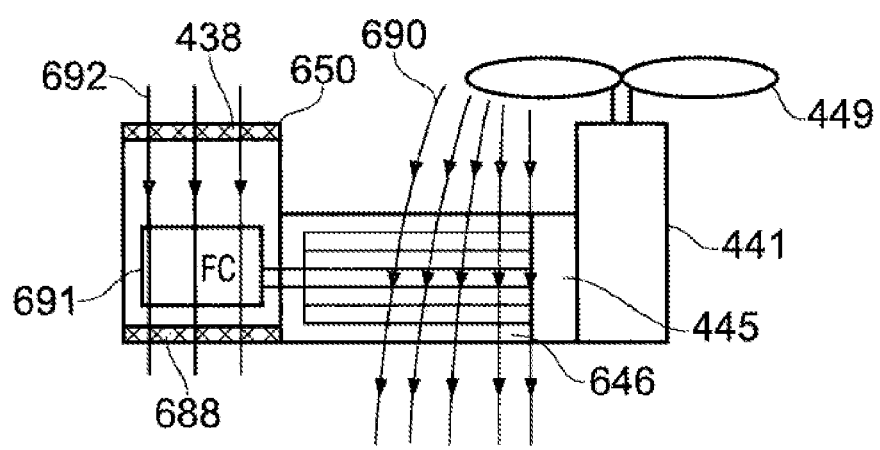

FIG. 6b illustrates a schematic longitudinal cross section through one of the struts 441 of the rotorcraft 600 of FIG. 6a. The body 438 has a bottom surface comprising an air outlet 688 provided on a reverse surface to the top surface that comprises the air inlet 650.

A fuel cell 691 is provided within the central body 438. A first air flow path 692 is provided through the body 438 from the air inlet 650, through the fuel cell 691 and out of the air outlet 688. The air exhausted from the air outlet 688 contributes to a downdraught of the rotorcraft 600.

A second air flow path 690 is provided by air disturbed by the rotor 449 of the propulsion module 441. The second air flow path 690 passes through a portion of the strut 445 composed of the coolant structure 646. The second air flow path 690 cools the coolant structure 646 by convection and so dissipates heat. In this way, heat is drawn away from the fuel cell system components that are thermally coupled to the coolant structure 646 and so the overall temperature of the fuel cell system components is reduced.

In an alternative example, one or more coolant structures within the struts may be provided in an arrangement such as those described with reference to FIGS. 5a to 5e.

The following description of an unmanned aerial vehicle is also disclosed. The vehicle comprises:

(I) a fuel cell (FC) integrated with/near propeller module thereby providing air flow to FC with the propeller and/or airspeed without need of additional fans—this also provide more redundancy to the airframe in the event that some of it is not working.

There is, de facto, distributed power across the airframe so not all prop modules stop at the same time if one FC fails. The fuel may also be distributed or centralised.

(II) FC as part of the structural struts and/or beam parts of the airframe itself (I) can be combined with (I) above if the FC is near the propellers, e.g. with beams connecting the main body of a quadcopter or such to the propeller/electrical motor module. A fuel cell stack is made of plates so is especially rigid in the plane perpendicular to the bipolar plates.

(III) a planar FC, with external and internal surfaces of the airframe (chassis, enclosure/any surfaces whether active of passive transformed into a power source.

This can be used either for main propulsion services or for hotel loads/APUs.

Further embodiments are intentionally within the scope of the accompanying claims.

The invention claimed is:

1. An unmanned aerial vehicle comprising a plurality of fuel cells,
   wherein the plurality of fuel cells provide a structural component of the vehicle;
       wherein the plurality of fuel cells are distributed about the vehicle and,
   wherein the vehicle comprises a plurality of propulsion modules and each propulsion module is associated with a respective one of the plurality of fuel cells,
   wherein the vehicle comprises an air inlet in communication with the plurality of fuel cells, wherein the plurality of propulsion modules are configured to provide air through the air inlet to the plurality of fuel cells.

2. The unmanned aerial vehicle of claim 1, wherein each propulsion module is configured to provide oxidant and/or coolant to the associated fuel cell.

3. The unmanned aerial vehicle of claim 2, wherein each propulsion module is the only active source of oxidant and/or coolant to the associated fuel cell.

4. The unmanned aerial vehicle of claim 2, wherein each propulsion module has a propeller or rotor.

5. The unmanned aerial vehicle of claim 2, wherein at least one fuel cell is integral with a surface of the vehicle.

6. The unmanned aerial vehicle of claim 2, wherein each fuel cell provides power for propulsion of the vehicle.

7. The unmanned aerial vehicle of claim 2, wherein at least one of the plurality of fuel cells provides power for auxiliary or on-board functions of the vehicle.

8. An unmanned aerial vehicle comprising a plurality of fuel cells,
   wherein the plurality of fuel cells provide a structural component of the vehicle; and
       the vehicle further comprising an air inlet associated with each fuel cell in the plurality of fuel cells, wherein an air inlet of each fuel cell is associated with a respective propulsion module of a plurality of propulsion modules,
       wherein each propulsion module is configured to provide oxidant and/or coolant to the associated fuel cell.

9. The unmanned aerial vehicle of claim 8, wherein each propulsion module is the only active source of oxidant and/or coolant to the associated fuel cell.

10. The unmanned aerial vehicle of claim 8, wherein each propulsion module has a propeller or rotor.

11. The unmanned aerial vehicle of claim 8, wherein at least one fuel cell is integral with a surface of the vehicle.

12. The unmanned aerial vehicle of claim 8, wherein each fuel cell provides power for propulsion of the vehicle.

13. The unmanned aerial vehicle of claim 8, wherein at least one of the plurality of fuel cells provides power for auxiliary or on-board functions of the vehicle.

\* \* \* \* \*